(12) United States Patent
Yoshida (10) Patent No.: US 6,545,389 B1
(45) Date of Patent: Apr. 8, 2003

(54) DRIVING CONTROL APPARATUS AND DRIVING CONTROL METHOD

(75) Inventor: Ryuichi Yoshida, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/088,976

(22) Filed: Jun. 2, 1998

(30) Foreign Application Priority Data

Jun. 2, 1997 (JP) .............................................. 9-143993

(51) Int. Cl.⁷ .............................................. H01L 41/09
(52) U.S. Cl. ...................................................... 310/317
(58) Field of Search ......................................... 310/317

(56) References Cited

U.S. PATENT DOCUMENTS

| | | | | |
|---|---|---|---|---|
| 4,284,996 A | * | 8/1981 | Greve ........................... | 310/317 |
| 4,507,762 A | * | 3/1985 | Meyer et al. ................ | 310/317 |
| 4,639,735 A | * | 1/1987 | Yamamoto et al. ......... | 310/317 |
| 4,743,789 A | * | 5/1988 | Puskas ......................... | 310/316 |
| 5,204,576 A | * | 4/1993 | Mitsuyasu ................... | 310/317 |
| 5,225,941 A | * | 7/1993 | Saito et al. .................. | 359/824 |
| 5,589,723 A |   | 12/1996 | Yoshida et al. ............. | 310/328 |
| 5,786,654 A | * | 7/1998 | Yoshida et al. ............. | 310/328 |
| 5,907,212 A | * | 5/1999 | Odada ......................... | 310/328 |
| 5,917,267 A | * | 6/1999 | Miyazawa et al. .......... | 310/317 |

* cited by examiner

Primary Examiner—Thomas M. Dougherty
(74) Attorney, Agent, or Firm—Sidley Austin Brown & Wood LLP (57) ABSTRACT

A driving apparatus having a driving pulse generator including a high-speed electrifying circuit and a low-speed electrifying circuit connected to a transducer; and a controller which sets a low-speed electrification time to a first specified time, sets a time from a low-speed electrification start time to a high-speed electrification start time to a second specified time, makes the low-speed charging duration shorter than the first specified time during low-speed driving and makes a time period from a low-speed charging start time to a high-speed discharging start time shorter than the second specified time.

4 Claims, 8 Drawing Sheets

DRIVING CONTROL APPARATUS AND DRIVING CONTROL METHOD

This application is based on application No. Hei 9-143993 filed in Japan, the content of which is hereby incorporated by reference.

BACKGROUND OF THE INVENTION

1. Field of the Invention

The present invention relates to a control circuit and a control method of a driving apparatus using a transducer.

2. Description of the Related Art

Conventionally, a variety of driving apparatuses using a piezoelectric element have been proposed.

Figure 1:
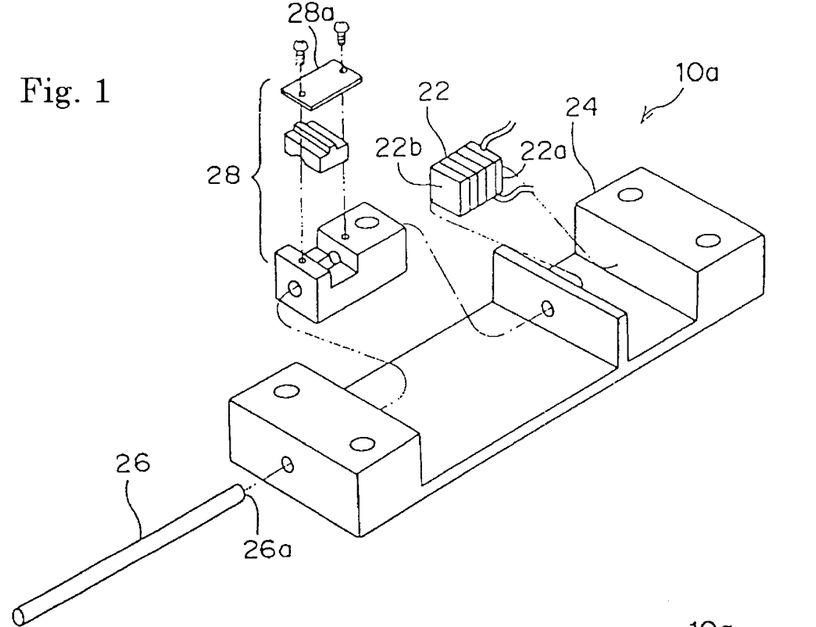
FIG. 1 is an exploded perspective view of a prior art linear movement type driving apparatus.
Figure 2:
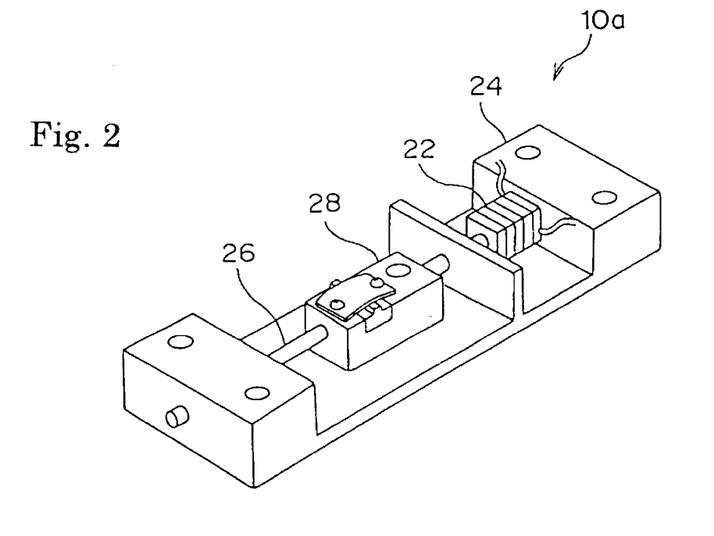
FIG. 2 is an overall perspective view of the driving apparatus shown in FIG. 1.

FIG. 1 is an exploded perspective view of a prior art linear movement type driving apparatus, while FIG. 2 is an overall perspective view of the driving apparatus shown in FIG. 1. A driving apparatus 10a is provided with a fixed member 24, a piezoelectric element 22, a driving shaft 26 slidably supported in its axial direction by the fixed member 24 and a driving unit 28 to be connected to a stage (not shown) which moves with a driven member of, for example, a component placed on it. The piezoelectric element 22 is a sort of electromechanical transducer, the length of which is varied by voltage application. The piezoelectric element 22 has one end surface 22a affixed to the fixed member 24 in the direction in which it extends or contracts and has the other end surface 22b affixed to one axial end surface 26a of the driving shaft 26 in the direction in which it extends or contracts. The driving unit 28 is provided with a leaf spring 28a, and the driving unit 28 is frictionally coupled with the driving shaft 26 by the urging force of this leaf spring 28a. In this driving apparatus 10a, the driving unit 28 is moved in a specified direction along the driving shaft 26 when the driving shaft 26 is vibrated in a reciprocating manner in the axial direction by applying to the piezoelectric element 22 a periodic pulse voltage having a sawtooth waveform, for example.

Figure 3:
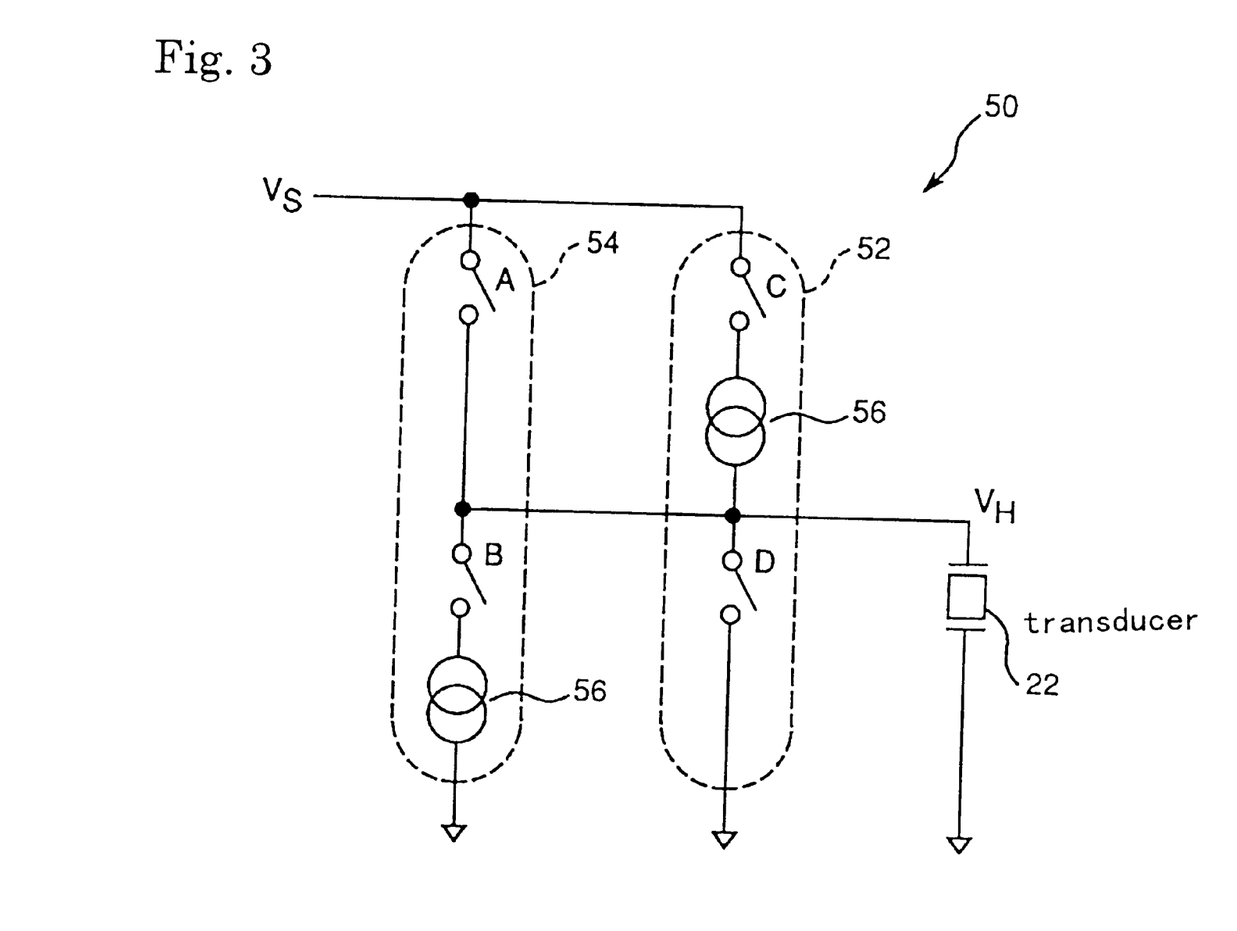
FIG. 3 is a circuit diagram showing a prior art driving circuit.

For the purpose of applying a sawtooth-shaped pulse voltage to an electromechanical transducer, or to the piezoelectric element 22 of this driving apparatus 10a, a driving circuit 50 shown in FIG. 3 is used. This driving circuit 50 is constructed by combining a low-speed charging circuit, a high-speed discharging circuit, a low-speed discharging circuit and a high-speed charging circuit, and it has the advantage that its circuit can be compacted as compared with a driving circuit of a type which forms a sawtooth-shaped pulse by means of a digital circuit and further amplifies this pulse.

The driving circuit 50 has a first circuit 52 for driving in a first direction and a second circuit 54 for driving in a second direction opposite the first direction.

The first circuit 52 is constructed of switches C and D and a constant-current section 56. One terminal of the switch C is connected to a power source for supplying a constant voltage Vs, and the other terminal of the switch C is connected to one terminal of the constant-current section 56. The other terminal of the constant-current section 56 is connected to one terminal of the switch D and to one terminal of the piezoelectric element 22, and the other terminal of the switch D and the other terminal of the piezoelectric element 22 are connected to the ground.

The second circuit 54 is constructed of switches A and C and a constant-current section 56. One terminal of the switch A is connected to the power source for supplying the constant voltage Vs, and the other terminal of the switch A is connected to one terminal of the switch B and to one terminal of the piezoelectric element 22. The other terminal of the switch B is connected to one terminal of the constant-current section 56, and the other terminal of the constant-current section 56 is connected to the ground.

Figure 4:
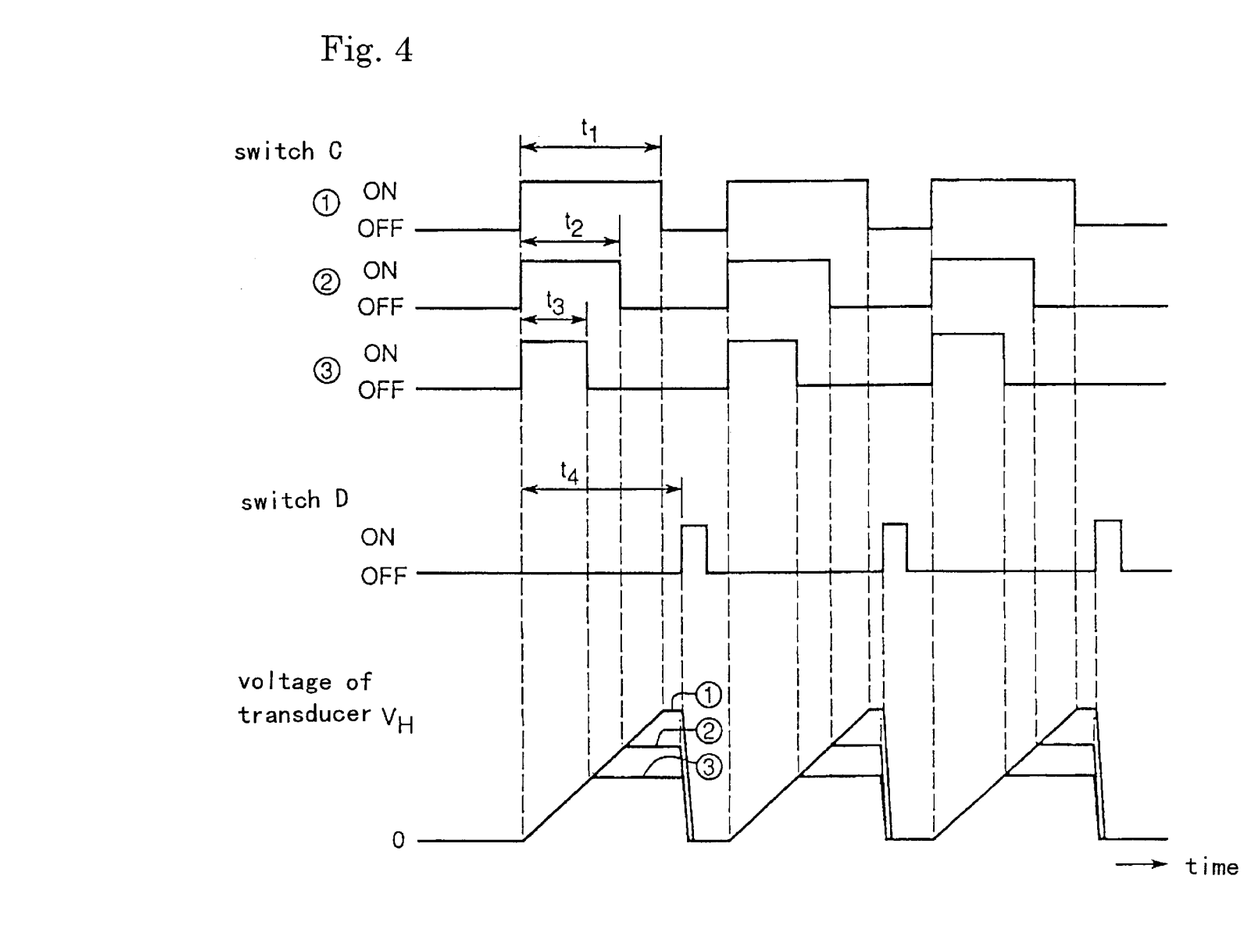
FIG. 4 is a waveform chart showing the driving pulse when low-speed electrification duration is varied.

This driving circuit 50 applies a periodic sawtooth-shaped pulse voltage to the piezoelectric element 22 as shown in FIG. 4 when driving the driving apparatus in the first direction. This voltage waveform is generated by forming a low-speed charging circuit by closing the switch C, thereafter opening the switch C and then closing the switch D thus forming a high-speed discharging circuit.

In this case, as shown in FIG. 4, the driving speed can be varied by changing the duration of only low-speed charging duration t1, t2, t3 during which time the switch C is closed and making constant at all times a duration t4 starting from the start of the low-speed charging to the start of high-speed discharging at which point the switch D is closed. That is, if the low-speed charging duration is reduced in the order of t1→t2→t3 as indicated by waveforms ①, ② and ③ of the piezoelectric element voltage in FIG. 4, then a voltage VH to be supplied to the piezoelectric element 22 is reduced, so that the driving speed becomes low, or slow.

Figure 5:
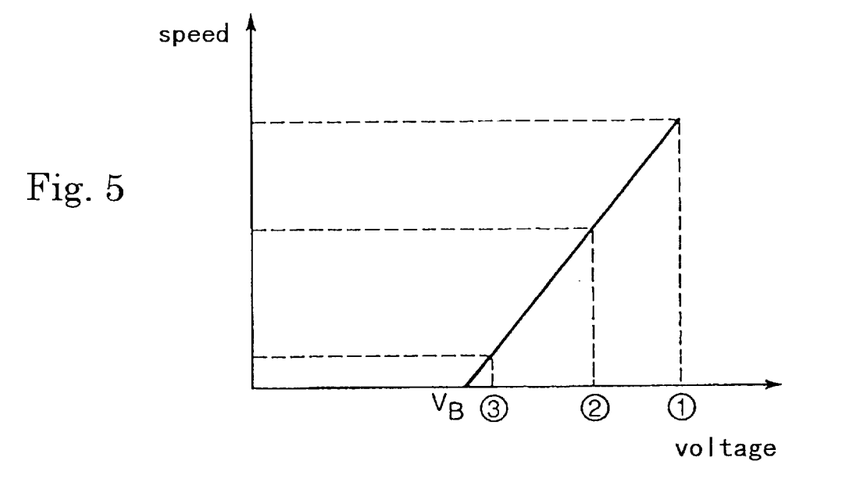
FIG. 5 is a graph of a voltage-to-speed characteristic when driving is executed using the driving pulse shown in FIG. 4.

However, according to this control method, as shown in the voltage-to-speed characteristic of FIG. 5, the inclination of the characteristic line becomes steep. Furthermore, a voltage VB of the piezoelectric element 22 when the driving apparatus starts driving becomes high. Therefore, the resolution of the driving speed cannot be made excessively high. Furthermore, the speed stability during low-speed driving is bad.

SUMMARY OF THE INVENTION

The object of the present invention is to provide a driving control apparatus and driving control method whose resolution of driving speed and speed stability at low speed are improved.

Specifically, the driving control apparatus of the present invention is a driving control apparatus for use in a driving apparatus comprising an electromechanical transducer which extends and contracts in a specified direction, either a fixed body or a moving body connected to one end in a direction in which the electromechanical transducer extends or contracts; a driving frictional member connected to the other end in the extension/contraction direction of the electromechanical transducer; and the other one of either the fixed body or the moving body frictionally coupled with the driving frictional member.

The driving control apparatus of the present invention comprises a driving pulse generating means including a high-speed electrifying circuit and a low-speed electrifying circuit connected to the electromechanical transducer; and a controller which sets a low-speed electrification time to a first specified time, sets a time from a low-speed electrification start time to a high-speed electrification start time to a second specified time, makes the low-speed charging duration shorter than the first specified time during low-speed driving and makes a time period from a low-speed charging start time to a high-speed discharging start time shorter than the second specified time, thereby controlling the electrification timing. An approximately sawtooth-shaped pulse voltage formed by low-speed electrification by means of the low-speed electrifying circuit of the driving pulse generating means and the high-speed electrification by means of the high-speed electrifying circuit of the driving pulse generating means is applied to the electromechanical transducer to extend or contract the same, thereby driving the moving body in a specified direction with respect to the fixed body.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 6:
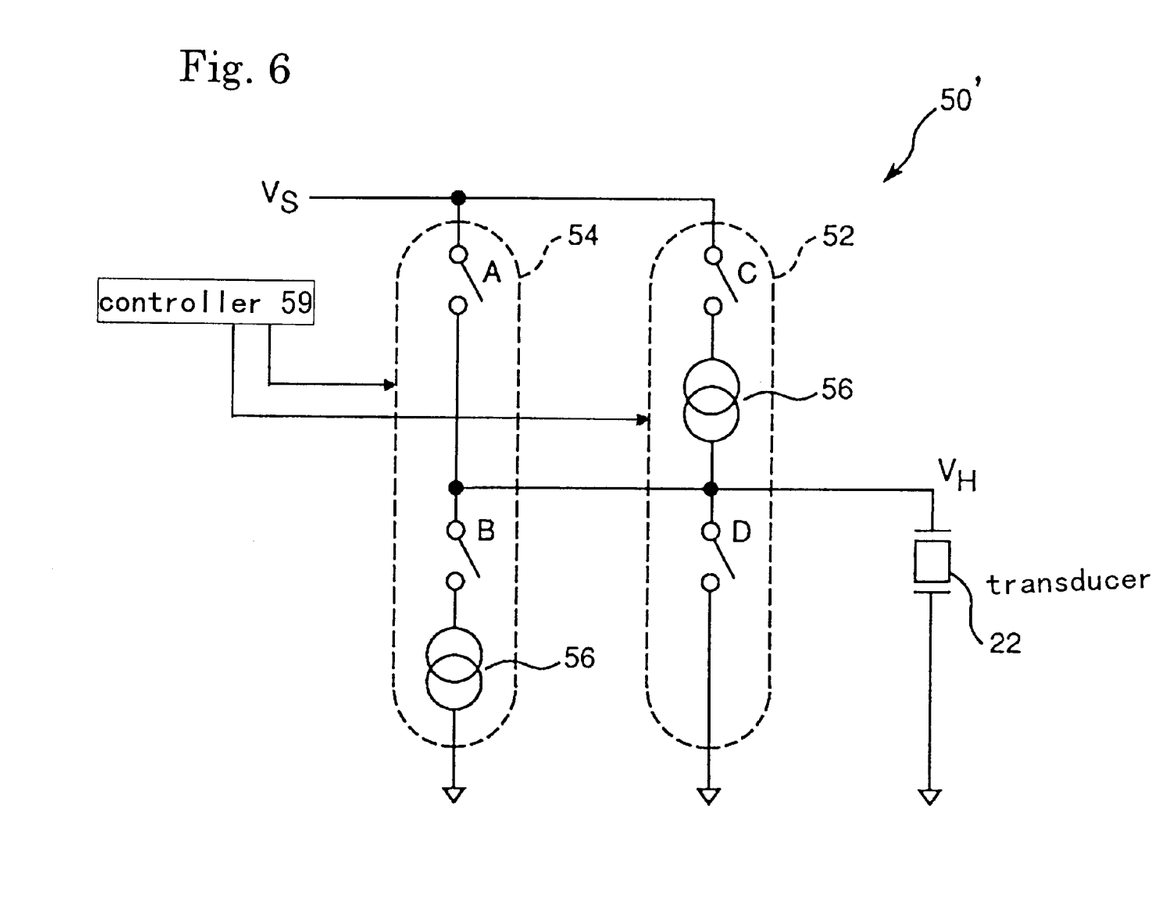
FIG. 6 is a circuit diagram of a driving control apparatus of the present invention.

FIG. 6 is a circuit diagram of a driving control apparatus of the present invention. A driving circuit 50' is the same as the prior art in that driving power is supplied by the driving circuit 50 shown in FIG. 4 to the piezoelectric element 22 of the driving apparatus 10a shown in FIG. 1. However, it differs from the prior art in the timing of the opening and closing of the switches C and D by a controller 59.

Figure 7:
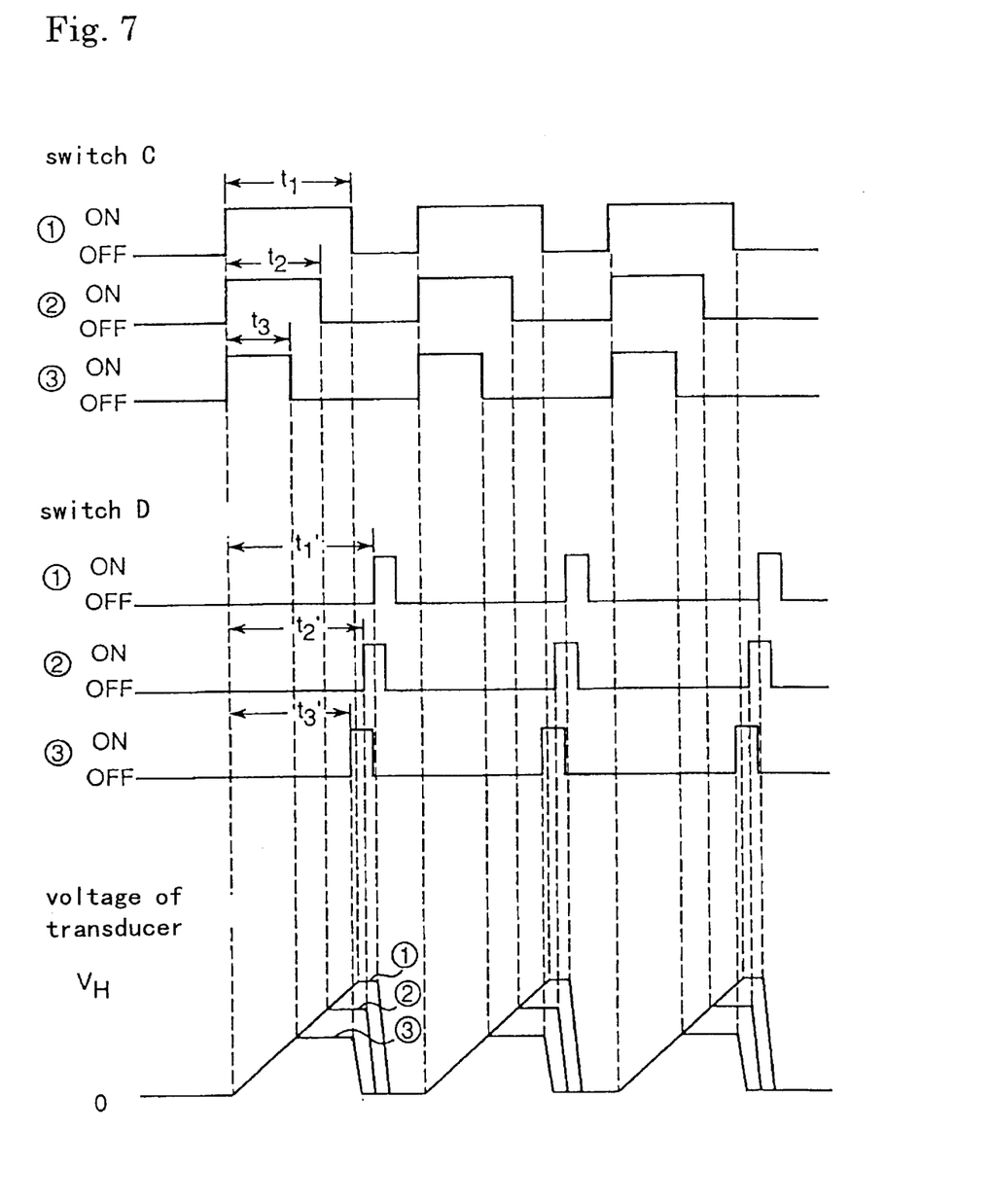
FIG. 7 is a waveform chart showing the driving pulse of the present invention.

FIG. 7 is a waveform chart showing the driving pulse of the present invention. That is, when driving in the first direction, the piezoelectric element 22 is slowly charged by a constant-current source 56 upon turning on the switch C as indicated in (I) Switch C Operation, and the piezoelectric element voltage VH gradually increases as indicated in (III) Piezoelectric Element Voltage. In this case, the shorter the ON-state duration of the switch C, i.e., the low-speed charging duration t1, t2, t3 is, the lower the piezoelectric element voltage VH is.

Next, the switch C is turned off. By this operation, the increasing change of the piezoelectric element voltage VH stops, and the piezoelectric element voltage VH maintains in a constant state.

Next, the switch D is turned on for a specified time as indicated in (II) Switch D Operation. By this operation, electric charges charged in the piezoelectric element 22 are rapidly discharged from the switch D, and the piezoelectric element voltage VH is rapidly reduced. A switch D turning-on start time, i.e., a duration t1', t2', t3' from the low-speed charging start time to the high-speed discharging start time is determined depending on the ON-state duration t1, t2, t3 of the switch C.

That is, the shorter the ON-state duration of the switch C is and the smaller the piezoelectric element voltage VH is, the earlier the switch D will be turned ON. In the example shown in FIG. 7, if the charging duration is reduced by Δt, then the discharging start time is made earlier by Δt/2. That is, there is a relation of $t1'-t2'=(t1-t2)/2$, $t1'-t3'=(t1-t3)/2$.

Figure 8:
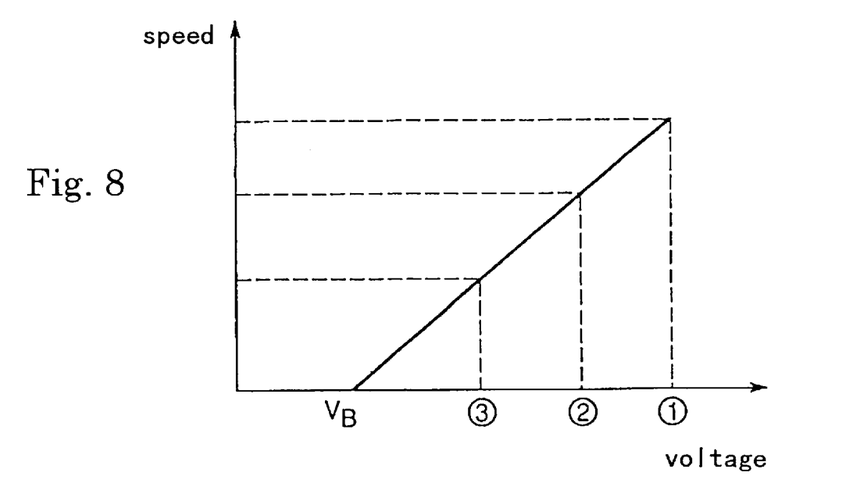
FIG. 8 is a graph of a voltage-to-speed characteristic when driving is executed using the driving pulse shown in FIG. 7.

Under the aforementioned control, the voltage-to-speed characteristic becomes as shown in FIG. 8. In FIG. 8, as compared to the case of the prior art control method shown in FIG. 5, the voltage VB at which the driving apparatus starts driving is small, the apparatus starts to move from a low voltage and the inclination of the characteristic line is gradual. As is evident from this fact, according to the control method of the present embodiment, the resolution of the speed of the driving apparatus can be increased, and the stability at low speed can be improved.

It is to be noted that the present invention is not limited to the aforementioned embodiment and is able to be implemented in the form of a variety of other embodiments. For example, the same results can be obtained when the invention is used for the rotary type driving apparatus shown in FIG. 9 and FIG. 10 or the self-propelled type driving apparatus shown in FIG. 11 and FIG. 12.

Figure 9:
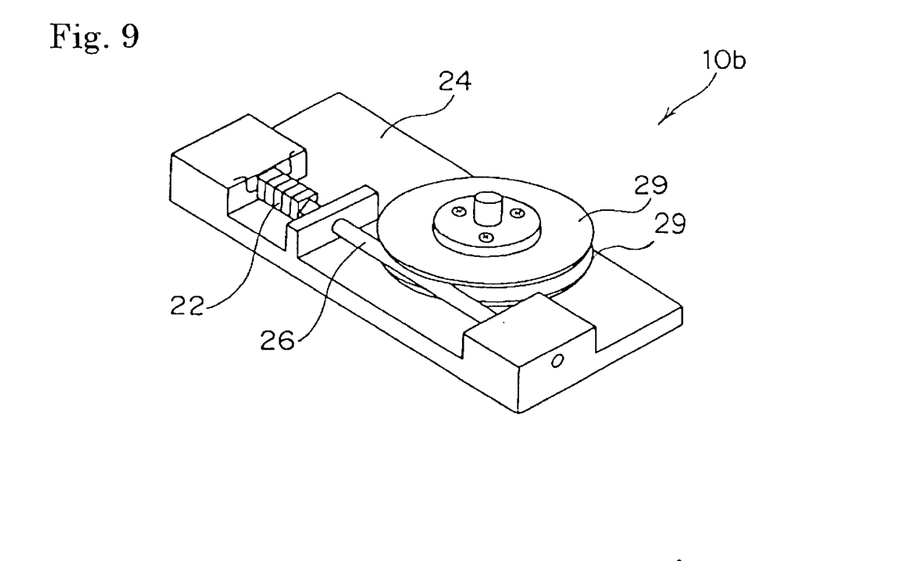
FIG. 9 is a perspective view of a driving apparatus of a first rotary type.

FIG. 9 is a perspective view of a driving apparatus of a first rotary type.

In a driving apparatus 10b of the first rotary type, similar to the linear movement type shown in FIG. 1, one end of the piezoelectric element 22 is affixed by adhesion to the fixed member 24 and a driving shaft 26 is affixed by adhesion to the other end of the piezoelectric element 22. A pair of disks 29 and 29 whose center portions are rotatably supported hold the driving shaft 30 in the vertical direction. In this case, by adjusting the interval between the pair of disks 29 and 29, the frictional force generated between the disks 29 and the driving shaft 26 is adjusted.

Figure 10:
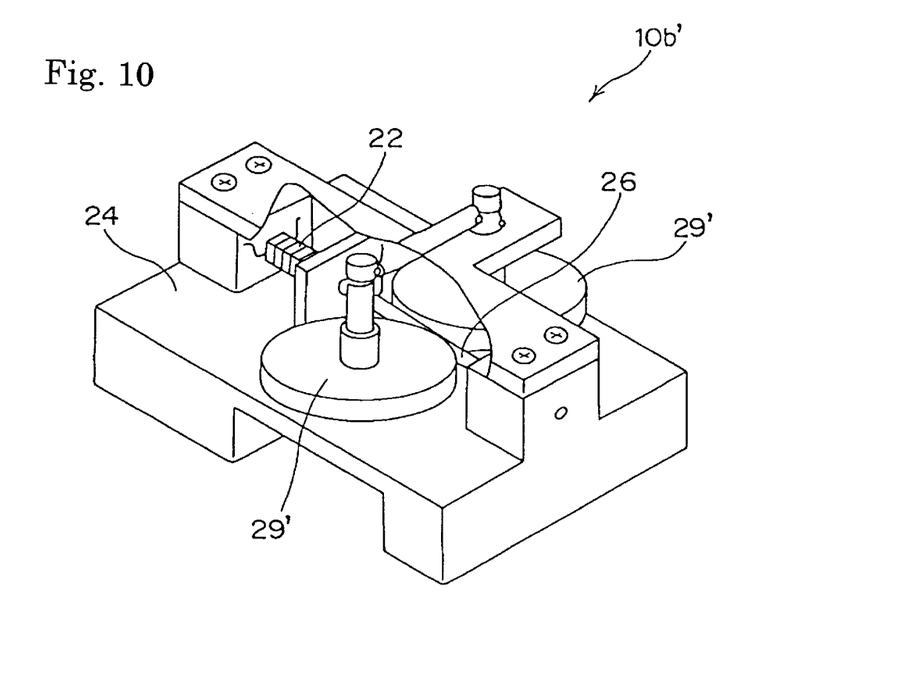
FIG. 10 is a perspective view of a driving apparatus of a second rotary type.

FIG. 10 is a perspective view of a driving apparatus of a second rotary type.

In a driving apparatus 10b', similar to the first rotary type shown in FIG. 9, one end of the piezoelectric element 22 is affixed by adhesion to the fixed member 24 and the driving shaft 26 is affixed by adhesion to the other end of the piezoelectric element 22. Then, a pair of rollers 29' and 29' whose center portions are rotatably supported hold the driving shaft 26 in the sidewise direction. In this case, by adjusting the interval between the pair of rollers 29' and 29', the frictional force generated between the rollers 29' and the driving shaft 26 is adjusted.

The rollers 29 and 29 and 29' and 29' are driven by applying the specified pulse voltage shown in FIG. 7 similar to the linear movement type driving apparatus shown in FIG. 1.

Figure 11:
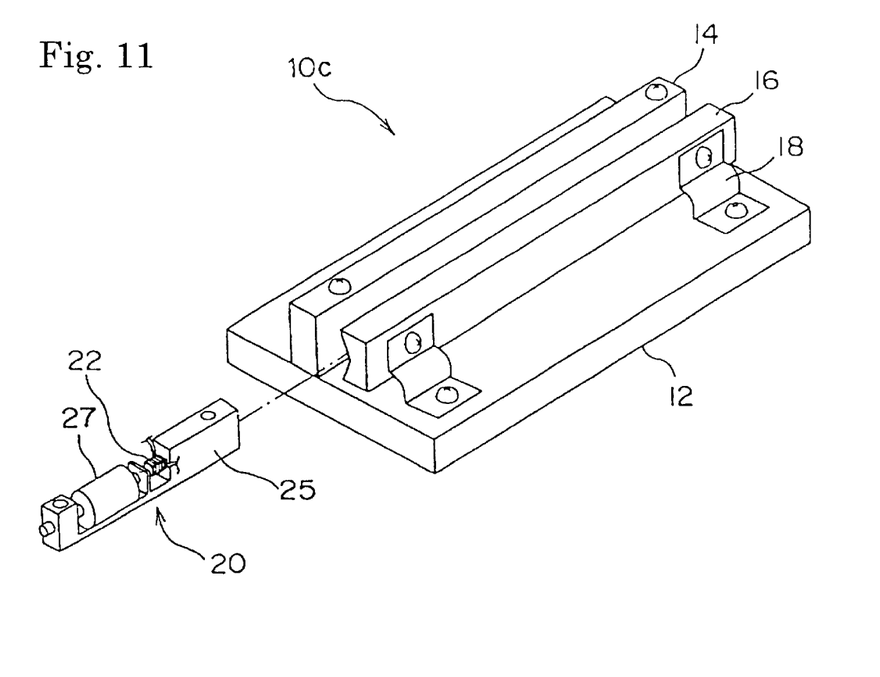
FIG. 11 is a perspective view of a driving apparatus of a self-propelled type.
Figure 12:
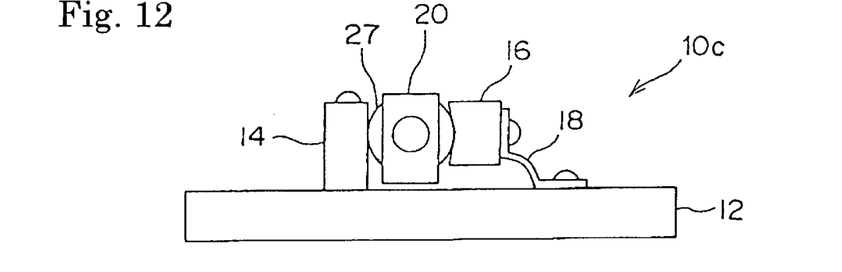
FIG. 12 is a front view of the driving apparatus shown in FIG. 11.

FIG. 11 is a perspective view of a driving apparatus of a self-propelled type, while FIG. 12 is a front view of the driving apparatus shown in FIG. 11.

In this case, the self-propelled type means that a driving unit 20 itself including the piezoelectric element 22 moves. In a self-propelled type driving apparatus 10c, a first guide member 14 is affixed to a base 12, while a second guide member 16 arranged parallel to the first guide member 14 is supported in a state in which it is urged toward the side of the first guide member 14 by a support spring 18. Affixed to one end of the piezoelectric element 22 is a moving body 25 having a specified mass, while a driving shaft 27 having a mass smaller than that of the moving body 25 is affixed to the other end of the piezoelectric element 22, those members being integrated for the formation of the driving unit 20. The driving unit 20 is arranged between the first and second guide members 14 and 16, and the driving shaft 27 is frictionally coupled with the first and second guide members 14 and 16 while being held between them. Also in this driving apparatus 10c, the moving body 25 moves with the driving shaft 27 kept unmoved when the piezoelectric element 22 is slowly displaced by the application of the pulse voltage shown in FIG. 7. When the piezoelectric element 22 is rapidly displaced, the driving shaft 27 slides with respect to the first and second guide members 14 and 16 with the moving body 25 kept unmoved, thereby driving the driving unit 20. By repeating the displacement of the piezoelectric element, the driving unit 20 moves and the other object to be driven connected to the driving unit 20 is driven.

In this case, it is a matter of course that an electromechanical transducer other than the piezoelectric element can be used in the aforementioned driving apparatus.

According to the aforementioned control method, in the driving apparatus, the electromechanical transducer is slowly displaced in the first direction by the low-speed charging, and by static friction between the driving frictional member and either the fixed body or the moving body, the other one of either the fixed body or the moving body is displaced in the first direction. Then the electromechanical transducer is rapidly displaced in the second direction by the high-speed discharging, and the inertial force of either the fixed body or the moving body surpasses the frictional force between the driving frictional member and the other one of either the fixed body or the moving body, as a result of which a slip is generated, thereby bringing only the driving frictional member back into the original position. By repeating this operation, the moving body is moved relative to the fixed body. When fixing and connecting the moving body to one end of the electromechanical transducer, the mass of the moving body is made greater than the mass of the driving frictional member, by which driving is executed so that the inertial force of the moving body surpasses the inertial force of the driving frictional member.

According to the aforementioned control method, if the low-speed charging duration is reduced, then the high-speed discharging start time becomes early accordingly. Therefore, the electromechanical transducer is slowly displaced in the first direction and then rapidly displaced in the second direction sooner than in the prior art. By this operation, it is displaced in the opposite direction, i.e., the second direction while the inertial force due to the displacement in the first direction remains, for which a relative slip tends to occur more easily between the driving frictional member and the other one of either the fixed body or the moving body. Therefore, the low-speed charging duration is shorter than that achieved by the prior art control method, so that the relative slip occurs even if the voltage applied to the electromechanical transducer is low. Therefore, according to the aforementioned control method, the driving can be effected from the low voltage, and the driving speed becomes faster during an identical low-speed charging duration.

When executing driving in the second direction opposite to the first direction, the piezoelectric element 22 is slowly discharged by the constant-current source 56 upon turning on the switch B as indicated in (I) Switch C Operation shown in FIG. 7, as a result of which the piezoelectric element voltage VH is gradually reduced. In this case, the shorter the ON-state duration of the switch B, i.e., the shorter the low-speed discharging duration t1, t2, t3 is, the smaller the difference between the piezoelectric element voltage VH and the power supply voltage Vs results.

Next, the switch B is turned off. By this operation, the descending change of the piezoelectric element voltage VH stops, so that the piezoelectric element voltage VH maintains a constant state.

Next, the switch A is turned on for a specified time as indicated in (II) Switch D Operation. By this operation, the piezoelectric element 22 is rapidly charged up to the power supply voltage Vs. The switch A turning-on start time, i.e., the duration t1', t2', t3' from the low-speed discharging start time to the high-speed charging start time is determined depending on the ON-state duration t1, t2, t3 of the switch B.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modification and substitutions of parts and elements as fall within the spirit and scope of the invention.

What is claimed is:

1. A driving apparatus comprising:

an electromechanical transducer which can extend and contract in a predetermined direction, said transducer having a first end and a second end in the predetermined direction;

a first member connected to the first end of said transducer;

a driving frictional member connected to the second end of said transducer;

a second member frictionally coupled with said driving frictional member;

a driving pulse generating means including a high-speed electrifying circuit and a low-speed electrifying circuit, said driving pulse generating means being connected to said electromechanical transducer; and a controller which is capable of controlling an electrification period of time and an electrification start time of said high-speed electrifying circuit and said low-speed electrifying circuit of said driving pulse generating means;

wherein said electrification start time of said high-speed electrifying circuit from said start time of said low-speed electrifying circuit is changed based on said electrification period of the low-speed electrifying circuit.

2. A driving apparatus comprising:

an electromechanical transducer which can extend and contract in a predetermined direction, said transducer having a first end and a second end in the predetermined direction;

a first member connected to the first end of said transducer;

a driving frictional member connected to the second end of said transducer;

a second member frictionally coupled with said driving frictional member;

a driving pulse generating means including a high-speed electrifying circuit and a low-speed electrifying circuit, said driving pulse generating means being connected to said electromechanical transducer; and a controller which is capable of controlling an electrification period of time and an electrification start time of said high-speed electrifying circuit and said low-speed electrifying circuit of said driving pulse generating means;

wherein said controller, for a first driving speed, can set a low-speed electrification period of time to be a first period of time and can set a period of time from a low-speed electrification start time to a high-speed electrification start time to be a second period of time; wherein said controller, for a second driving speed, can set the low-speed electrification period of time to be shorter than the first period of time and can set the period of time from the low-speed electrification start time to the high-speed electrification start time to be shorter than the second period of time; and wherein said second driving speed is lower than said first driving speed.

3. A driving apparatus according to claim 2, wherein said controller can change the low-speed electrification period of time by $\Delta t$ and can change the period of time from the low-speed electrification start time to the high-speed electrification start time by $\Delta t/2$.

4. A method to drive a driving apparatus having an electromechanical transducer which can extend and contract in a predetermined direction, said transducer having a first end and a second end, a first member connected to the first end of said transducer, a driving frictional member connected to the second end of said transducer, and a second member frictionally coupled with said driving frictional member, the method comprising the steps of:

electrifying said transducer by low-speed charging or discharging during a first period of time; and electrifying said transducer by high-speed charging or discharging during a second period of time, wherein the start time of the second period of time from the start time of the first specified time is changed based on the first period of time.

* * * * *